United States Patent Office 3,376,893
Patented Apr. 9, 1968

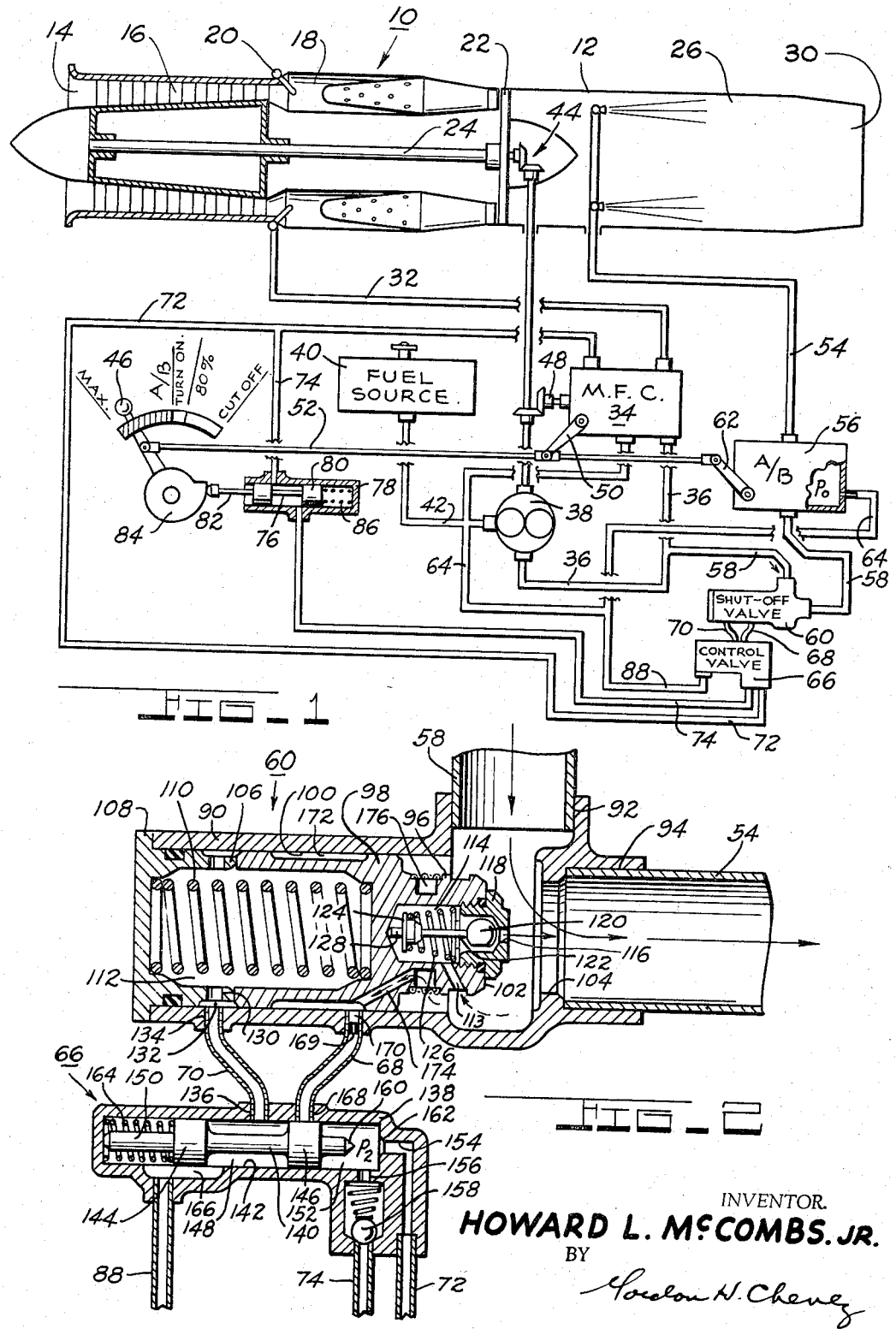

3,376,893
EMERGENCY FUEL SHUTOFF VALVE
Howard L. McCombs, Jr., South Bend, Ind., assignor to The Bendix Corporation, South Bend, Ind., a corporation of Delaware
Filed Nov. 23, 1964, Ser. No. 413,112
Claims priority, application Sweden, Oct. 22, 1964, 12,756/64
4 Claims. (Cl. 137—599.2)

ABSTRACT OF THE DISCLOSURE

A fluid flow apparatus having a servo operated two position fluid flow shutoff valve movable to open or closed positions and a normally open spring loaded valve carried thereby for permitting a predetermined rate of fluid flow therethrough when said shutoff valve is closed. The spring loaded valve is flow responsive and actuated to a closed position when the fluid flow therethrough exceeds said predetermined rate.

---

The present invention is adapted for use although not limited thereto in establishing and disestablishing a relatively high rate of fuel flow to the afterburner system of an aircraft gas turbine engine in accordance with selected conditions of engine operation. In the usual afterburner fuel system, the fuel cutoff valve or valves are located within or downstream from and in series with an afterburner fuel control which provides a metered flow of fuel to the afterburner as a function of certain conditions of operation such as power lever position. While it is desirable to have the fuel cutoff valve or valves open or close positively and reliably in response to one or more of the abovementioned conditions of operations, malfunctions do occur whereby the cutoff valve or valves fail to close which results in unwanted fuel flow to the afterburner fuel nozzles.

Also, many afterburner fuel systems necessarily are located relatively close to the afterburner section of the engine and accordingly are subject to a relatively high heat transfer rate. In such cases, it is desirable to provide a continuous circulating flow of fuel through the fuel control apparatus to provide cooling thereof during normal operation. However, in the event that a malfunction of the fuel cutoff valve or valves occurs in the afterburner fuel control which would result in unwanted fuel flow to the afterburner it is desirable to disestablish all fuel flow including cooling fuel to the afterburner fuel control and thus the afterburner as a safety precaution.

It is an object of the present invention to provide simple and reliable fluid fuel control apparatus.

It is another object of the present invention to provide a fuel shutoff valve which operates to disestablish a main flow of fuel to a fuel control downstream therefrom and yet permit a predetermined rate of fuel flow therethrough to said fuel control for cooling purposes and which disestablishes the cooling flow of fuel in the event that the rate of flow thereof exceeds the predetermined value.

It is still another object of the present invention to provide fluid flow control apparatus which responds to one or more control input signals and moves to a closed or open position substantially non-instantaneously to avoid fluid pressure disturbances upstream therefrom.

Other objects and advantages of the present invention will be apparent from the following description taken in conjunction with the accompanying drawings wherein:

FIGURE 1 is a schematic representation of an aircraft gas turbine engine and associated fuel control system embodying the present invention.

FIGURE 2 represents the present invention removed from the fuel control system of FIGURE 1 and shown in detail.

Referring to FIGURE 1, numeral 10 designates a gas turbine engine having a casing 12 provided with an inlet 14 through which air passes to an air compressor 16 from which pressurized air passes to combustion chambers 18. Fuel nozzles 20 inject pressurized fuel into the combustion chambers 18 from which the resulting hot motive gases are discharged to turbine 22 thereby driving the same which turbine, in turn, drives compressor 16 via shaft 24. From turbine 22, the gases exhaust to afterburner section 26 wherein the gases mix with additional fuel injected by afterburner nozzles 28 and the resulting air-fuel mixture is burned to increase the temperature of the gases which subsequently pass out of exhaust nozzle 30 to the atmosphere.

The fuel nozzles 20 are supplied a metered flow of fuel via a conduit 32 leading from the outlet of a main fuel control 34 which is adapted to receive pressurized fuel via a fuel inlet conduit 36 connected to the outlet of an engine driven fuel pump 38. The fuel pump inlet communicates with a source of fuel 40 via conduit 42 and is driven by the turbine 22 through suitable shaft and gearing arrangements generally indicated by 44. The main fuel control 34 is conventional in that it includes fuel flow control apparatus, not shown, which controls the rate of fuel flow to conduit 32 as a function of various conditions of operation including compressor speed and the position of a control lever 46 movable over the range of positions indicated. The main fuel control 34 is provided a compressor speed signal via rotatable input member 48 connected to be driven by shaft and gearing 44 and a control lever 46 position signal via lever 50 suitably actuated by control lever 46 through rod 52.

The afterburner fuel nozzles 28 are supplied a metered flow of fuel via a conduit 54 leading from the outlet of an afterburner fuel control 56 which is adapted to receive pressurized fuel from pump 38 via conduit 36 and a conduit 58 which includes fuel shutoff valve 60. The afterburner fuel control 56 is conventional in that it includes fuel flow control apparatus including a fuel cutoff valve, not shown, which controls the rate of fuel flow to conduit 54 as a function of various conditions of operation including the position of control lever 46 which is connected to actuate lever 62 via rod 52. Reference is made to Patent No. 2,774,215, issued Dec. 18, 1956 to F. C. Mock and entitled "Tailpipe or Afterburning Control for Turbo Jet Engines," which discloses a control similar to afterburner fuel control 56. The interior of afterburner fuel control 56 is vented to the inlet of fuel pump 38 at relatively low fuel pressure $P_0$ via a restricted drain conduit 64.

A control valve 66 connected to shutoff valve 60 via passages 68 and 70 is provided to control the operation thereof in accordance with a turbine 22 speed signal generated as a fluid pressure signal within the main fuel control 34 and is transmitted through conduit 72 connecting main fuel control 34 and control valve 66. A branch conduit 74 connected to conduit 72 and leading therefrom to control valve 66 includes a slide valve 76 slidably carried in a casing 78 and provided with a land portion 80 which is adapted to move into and out of engagement with branch conduit 74 to disestablish and establish, respectively, flow therethrough depending upon the position of slide valve 76. The slide valve 76 is provided with a stem or cam follower 82 which is urged into engagement with a cam 84 by a spring 86 interposed between slide valve 76 and casing 78. The cam 84 is secured to control lever 46 and rotates about the pivotal axis of control lever 46 in response to movement of the same. A drain passage 88 connects control valve 66 with passage 64 at fuel pump inlet pressure $P_0$.

Referring to FIGURE 2, the fuel shutoff valve 60 includes a casing 90 having a fuel inlet port 92 and a fuel outlet port 94 connected to inlet conduit 58 and outlet conduit 54, respectively. A two position valve 96 is provided with a differential area piston portion 98 slidably carried in a bore 100 and a head portion 102 adapted to move into or out of engagement with an orifice 104 depending upon the position of the valve 96 to thereby disestablish or establish a main flow of fuel from inlet port 92 to outlet port 94. In the open position of valve 96 as shown in FIGURE 2, the piston portion 98 is adapted to bear against an annular stop 106 defined by a cap 108 which also closes one end of bore 100 and is suitably secured to casing 90 by any suitable fastening means, not shown. A compression spring 110 interposed between cap 108 and valve 96 serves to preload the valve 96 in a closing direction in opposition to the differential between fuel inlet pressure $P_1$ acting against the effective area of the one side piston portion 98 and the fuel pressure $P_1$ or $P_0$ in a chamber 112 to which the effective area of the opposite side of piston portion 98 is exposed.

A predetermined rate of fuel flow for the aforementioned cooling purpose is permitted to pass through valve 96 when the latter is in a closed position via a passage 113 formed in head portion 102 upstream from the sealing surface of valve 96 which abuts orifice 104, a chamber 114 in head portion 102 and an orifice 116 through which the fuel is discharged downstream from orifice 104. The orifice 116 is formed in a plug 118 which is threadedly secured to head portion 102 to thereby define a removable end portion of chamber 114. A generally spherical valve 120 disposed in chamber 114 is adapted to abut plug 118 thereby closing orifice 116 and is provided with an integral stem 122 and spring retainer 124. A compression spring 126 interposed between spring retainer 124 and plug 118 serves to preload valve 120 in an opening direction. A stop member 128 extending from spring retainer 124 is adapted to engage the closed end of chamber 114 thereby limiting movement of valve 120 in the opening direction.

The chamber 112 is vented to the control valve 66 via radial passages 130 and annulus 132 formed in the annular extension or stop 106, a port 134 in casing 90 and passage 70 which connects port 134 with a port 136 in control valve casing 138. A two position slide valve 140 slidably carried in a bore 142 in casing 138 is provided with land portions 144 and 146 separated by a reduced diameter portion 148. A stem 150 integral with slide valve 140 and serving as a stop engages the one end of bore 142 thereby limiting leftward movement of valve 140 as shown in FIGURE 2 in response to fuel pressure $P_1$ in a chamber 152 at the right hand end of bore 142 as viewed in FIGURE 2. The chamber 152 is vented to passage 72 via a passageway 154 one end of which is centrally located in the fixed end wall of chamber 152 and is vented to passage 74 via a radial port 156 and a normally closed spring loaded check valve 158. A valve member 160 extending from land portion 146 is coaxially arranged relative to a valve seat 162 formed at the one end of passage 154 and is adapted to cooperate therewith to block flow from passage 154 to chamber 152 when slide valve 140 is biased to the right under the influence of a compression spring 164 interposed between land portion 144 and the adjacent end of bore 142.

The land portion 144 slides along a recess 166 formed in the wall of bore 142 which communicates with conduit 88 at fuel pump inlet pressure $P_0$. As shown in FIGURE 2, the land portion 144 is adapted to occupy a position to the left of the right hand end of recess 166 thereby venting the recess 166 to port 136 which results in fuel at pressure $P_0$ in chamber 112. When the slide valve 140 is pressurized to the extreme right as viewed in FIGURE 2, the land portion 144 blocks recess 166 to disestablish communication between the recess 166 and port 136 whereas land portion 146 occupies a position to the right of a port 168 which communicates with passage 68, the latter passage 68 having restriction 169 secured therein and communicating with fuel pressure $P_1$ upstream from orifice 104 via port 170 in casing 90, annulus 172 in valve 140 and passage 174 and annulus 176 in valve 140. With land portion 146 to the right of port 168, the port 136 is vented to port 170 which results in fuel at pressure $P_1$ in chamber 112.

OPERATION

Initially, it will be assumed that the control lever 46 occupies a power request position corresponding to 90% engine speed in which case the main fuel control 34 is operative to supply fuel to the combustion chambers 18 to maintain said engine speed whereas the afterburner fuel system is not operative to establish flow to the afterburner nozzles 28.

Referring to FIGURE 2, the valve is positioned to the right thereby blocking orifice 104. The spherical valve 120 is held in an open position by the spring 126 thereby permitting a relatively small quantity of flow to pass through orifice 104 to the interior of afterburner fuel control 56 from which it passes through conduit 64 to the inlet of pump 38 thereby providing circulation of fuel through afterburner fuel control 56 to cool the same. The slide valve 140 is positioned to the right under the influence of spring 164 with valve member 160 seated against valve seat 162 thereby blocking flow from passage 154 into chamber 152. Port 168 is vented to port 136 thereby permitting fuel at relatively high pressure $P_1$ to flow to chamber 112 in response to which the valve 140 is pressurized to the closed position.

Now, assuming that the control lever 46 is actuated to the position requesting afterburner operation as shown in FIGURE 1 the fuel flow control apparatus, not shown, within afterburner fuel control 56 responds to movement of lever 62 resulting from actuation of control lever 46 to establish a corresponding flow of fuel to conduit 54. However, shut off valve 60 remains in the aforementioned closed position until two conditions exist, one of which conditions is established when control lever 46 passes the afterburner turn on position and the other of which is established by the main fuel control 34 upon turbine 22 reaching a predetermined speed, for example, 80% maximum speed. Since the turbine 22 speed of 90% maximum existing prior to the request for afterburner operation exceeded the required 80%, a corresponding fuel pressure signal generated within the main fuel control is applied to conduit 72 through which the pressure signal is transmitted to passage 154. The pressurized fuel in passage 154 acts against the relatively small area of valve 160 exposed to passage 154 but does not generate sufficient force to overcome the opposing force of spring 164. However, with the control lever 46 beyond the afterburner turn on position, the valve 76 is biased to the right as viewed in FIGURE 1 in response to the raised contour of cam 84 thereby permitting land portion 80 to move out of blocking engagement with branch conduit 74 thereby allowing fuel from passage 72 to flow therethrough to check valve 158. The check valve 158 opens in response to the fuel pressure in conduit 74 and permits fuel to pass therethrough into chamber 152. The force generated by the pressurized fuel acting against the transverse area of land portion 146 exposed to chamber 152 overcomes the spring 164 causing valve 140 to move to the position shown. Since the fuel pressures on opposite sides of check valve 158 become equalized the check valve 158 closes under the influence of the spring acting thereagainst. The chamber 112 is vented to fuel pressure $P_0$ and valve 96 biased accordingly away from orifice 104 and against stop 106 in response to the fuel pressure differential $P_1-P_0$ acting across piston portion 98. Fuel flow thus established through orifice 104 passes to the afterburner fuel control 56 which in turn, regulates the flow of fuel to the nozzles 28 as a function of the position of control lever 46.

It will be noted that valve 140 will now remain in the position shown irrespective of the position of control lever 46 as long as the speed of turbine 22 remains in excess of 80% maximum since chamber 152 is pressurized by fuel supplied through conduit 72. For example, the control lever 46 may be actuated to a lower power setting between afterburner turn on and 80% speed in which case the cam 84 rotates accordingly causing valve 76 to move to the left in response to the depressed contour of cam 84 which results in land portion 80 moving into blocking relationship with branch conduit 74. However, with branch conduit 74 blocked, the pressurization of chamber 152 is maintained via fuel flow through conduit 72.

The fuel presusre signal applied to conduit 72 from the main fuel control 34 ceases when the speed of turbine 22 decreases to 80% maximum or less whereupon the chamber 152 pressure drops accordingly permitting valve 140 to move to the right under the influence of spring 164. Valve 160 seats against valve seat 162 blocking passage 154 and land portion 146 uncovers port 168 thereby venting fuel at pressure $P_1$ to chamber 112. The fuel pressure differential across piston portion 98 decreases to 0 and valve 96 moves to the right under the influence of spring 110 thereby blocking orifice 104. It will be noted that the fuel pressure differential across piston portion 98 decreases at a rate dependent upon the volume of chamber 112 and the flow restriction imposed by restriction 169 which, in turn, controls the rate of movement of valve 96. The sizing of the chamber 112 and restriction 169 may be selected to provide the desired response of valve 96.

It is apparent that afterburner fuel flow is established at a higher setting corresponding to afterburner turn on of control lever 46 whereas fuel flow is disestablished at a lower setting of the control lever 46. Such action is provided to prevent cycling of the shutoff valve 60 in the event that the pilot desires to rapidly actuate the control lever 46 over a narrow range of positions adjacent afterburner turn on.

Assuming that the afterburner fuel control 56 malfunctions and continues to meter fuel to the nozzles 28 when the shutoff valve 60 occupies a closed position it will be recognized that the cooling flow of fuel through orifice 116 should be eliminated to prevent unwanted fuel flow to the nozzles 28. Under such a malfunction condition the flow through orifice 116 increases accordingly by virtue of the reduction in fuel back pressure in the afterburner fuel control 56 which back pressure is normally relatively high since the restricted conduit 64 imposes a significant restriction to the flow of cooling fuel out of afterburner fuel control 56. The reduced back pressure results in a flow of fuel through orifice 116 in excess of the predetermined rate of cooling flow which valve 120 is designed to permit. The increased flow through orifice 116 results in a corresponding higher pressure drop across valve 120 whereupon the force of spring 126 is overcome permitting valve 120 to seat against orifice 116 thereby disestablishing the cooling flow of fuel to the afterburner fuel control 56. Thus fuel flow is eliminated to the afterburner fuel control in the event of a malfunction thereof.

Various changes and modifications of the structure disclosed in the drawings and described heretofore may be made by those persons skilled in the art without departing from the scope of applicant's invention. Various fluid seals which may be required to seal one fluid pressure from another and necessary access openings in the various casings may be provided as required by means of ordinary engineering practices.

I claim:
1. Fluid flow control apparatus for establishing and disestablishing a flow of pressurized fluid through a supply conduit having an inlet and an outlet connected to a source of pressurized fluid and a relatively lower pressure source, respectively, said flow control apparatus comprising:
   a first orifice in the conduit for conducting fluid from the inlet to the outlet of the conduit;
   first valve means movable into and out of engagement with said orifice to disestablish and establish, respectively, flow therethrough;
   fluid pressure operated servo means operatively connected to said first valve means for actuating the same into and out of engagement with said orifice in response to at least one control signal indicative of a condition of operation;
   normally open valve means including a second orifice in parallel flow relationship with said first orifice and a valve member engageable therewith to control flow therethrough;
   resilient means operatively connected to said valve member for imposing a load thereagainst to bias the same out of engagement with said second orifice;
   said second orifice communicating with said conduit upstream and downstream of said first orifice to thereby establish a predetermined rate of flow through said conduit when said first valve means is engaged with said first orifice;
   said normally open valve means being responsive to the rate of flow through said second orifice and operative to overcome the load imposed by said resilient means when the rate of flow exceeds said predetermined value thereby disestablishing flow through said second orifice.

2. Fluid flow control apparatus as claimed in claim 1 wherein said fluid pressure operated servo means includes:
   a fluid pressure responsive member operatively connected to said first valve means and responsive to a control fluid pressure derived from a relatively low pressure source of fluid or a relatively high pressure source of fluid;
   a casing defining a chamber having first and second ports connected to said low and high pressure sources of fluid, respectively, a third port connected to supply fluid to said fluid pressure responsive member and fourth and fifth ports, respectively, communicating with sources of pressurized fluid representing first and second control signals;
   a two position spring loaded valve slidably carried in said chamber and adapted to simultaneously block said first port and communicate said second port with said third port to thereby actuate said first valve means into engagement with said first orifice or to simultaneously block said second port and communicate said first port with said third port to thereby actuate said first valve means out of engagement with said first orifice;
   said two position spring loaded valve having a relatively small effective area portion exposed to said first control fluid pressure signal supplied to said fourth port and adapted to block said fourth port and a relatively large effective area portion exposed to said second control fluid pressure signal supplied to said fifth port;
   said two position spring loaded valve being biased to said position whereby said first port is blocked in response to the spring load applied thereagainst and whereby said relatively small area portion blocks said fourth port;
   said spring load being operative to overcome the force generated by said first control fluid pressure signal acting against said relatively small area portion;

said relatively large area portion being responsive to said second control fluid pressure signal whereupon sufficient force is generated to overcome said spring load thereby actuating said two position valve to the other of its positions whereby said second port is blocked;

said two position valve remaining in said other position in response to said first control fluid pressure signal acting against said relatively large effective area when said second control fluid pressure signal is disestablished.

3. Fluid flow control apparatus as claimed in claim 1 wherein said fluid pressure operated servo means includes:
a piston slidably carried in a chamber and connected to actuate said first valve means;
a restricted passage communicating a source of relatively high fluid pressure with said chamber, and valve means in flow controlling relationship with said restricted passage and adapted to respond to said control signal to establish and disestablish flow through said restricted passage to said chamber;
said first valve means being actuated into engagement with said first orifice by said piston in response to the pressure rise in said chamber,
said first valve means being restricted to a predetermined rate of movement dependent upon the volume of said chamber and the effective flow area of said restricted passage.

4. Fluid flow control apparatus as claimed in claim 1 wherein:
said first valve means includes a circular head portion engageable with said first orifice to block flow therethrough;
said second orifice is formed in said circular head portion; and
said valve member is carried by said first valve means and movable therewith.

References Cited

UNITED STATES PATENTS

| | | | |
|---|---|---|---|
| 2,747,598 | 5/1956 | Wooldridge | 251—28 X |
| 1,161,648 | 11/1915 | Fisher | 137—599.2 |
| 2,659,384 | 11/1953 | Lowe | 137—599.2 |
| 2,960,155 | 11/1960 | Bartz | 137—488 X |
| 3,205,909 | 9/1965 | Oldfield | 134—488 X |

WILLIAM F. O'DEA, *Primary Examiner.*

D. LAMBERT, *Assistant Examiner.*